(12) United States Patent
Wood

(10) Patent No.: US 6,391,479 B1
(45) Date of Patent: May 21, 2002

(54) COATING INTERLAYER FOR IMPROVED COMPATIBILITY BETWEEN HR-120 AND ALUMINUM-CONTAINING OXIDATION RESISTANT METALLIC COATINGS

(75) Inventor: John Herbert Wood, St. Johnsville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/741,110

(22) Filed: Dec. 21, 2000

(51) Int. Cl.$^7$ .............................................. B32B 15/01
(52) U.S. Cl. ........................ 428/679; 427/405; 428/680; 428/681; 428/682; 428/650; 428/652; 428/653; 428/666; 428/667; 428/641; 428/636; 428/637; 428/638; 428/926
(58) Field of Search .................................. 428/679, 680, 428/681, 682, 650, 652, 653, 666, 667, 641, 636, 637, 638, 926; 427/405; 29/889.71

(56) References Cited

U.S. PATENT DOCUMENTS

| | | | | |
|---|---|---|---|---|
| 3,649,225 A | * | 3/1972 | Simmons, Jr. | 428/667 |
| 4,950,551 A | * | 8/1990 | Doetzer et al. | 428/650 |
| 5,232,662 A | * | 8/1993 | Culling | 420/586 |
| 5,900,283 A | * | 5/1999 | Vakil et al. | 427/405 |
| 6,093,260 A | * | 7/2000 | Petrone et al. | 427/405 |

\* cited by examiner

Primary Examiner—Robert R. Koehler
(74) Attorney, Agent, or Firm—Nixon & Vanderhye

(57) ABSTRACT

A coated metal component made of an alloy containing an intentional addition of nitrogen, comprising an oxidation-resistant coating layer and an intermediate layer disposed between the oxidation-resistant coating layer and the component. The intermediate layer is substantially devoid of nitrogen which if present would form a nitride with the oxidation-resistant layer.

13 Claims, 3 Drawing Sheets

200X

200X

COATING INTERLAYER FOR IMPROVED COMPATIBILITY BETWEEN HR-120 AND ALUMINUM-CONTAINING OXIDATION RESISTANT METALLIC COATINGS

The present invention relates generally to the formation of oxidation-resistant metallic coatings on metal components. More particularly, the present invention provides an interlayer which affords improved compatibility between the alloy HR-120 and aluminum-containing oxidation-resistant coatings.

BACKGROUND OF THE INVENTION

HR-120 is a Ni—Fe—Cr alloy with good high temperature properties which permit its substitution for more expensive Ni-based superalloys in some gas turbine hot section components. HR-120 has a nominal composition (wt %) of Ni 37; Cr 25; Co 3 max; Mo 2.5 max; W 2.5 max; Cb 0.7; Mn 0.7; Si 0.6; Al 0.1; C 0.05; B 0.004; N 0.2; balance Fe. However, if the temperature of operation is high enough, oxidation-resistant coatings may be required to protect the alloy from excessive oxidation attack. The oxidation coatings used in gas turbines are typically aluminum rich, since Al is the preferred element for forming a protective oxide scale on the surface of the component.

HR-120 is a rather unique high temperature alloy in that it incorporates an intentional addition of nitrogen which serves as a solid solution strengthener. High temperature exposure of HR-120 samples coated with the sprayed MCrAlY (M is Co, Ni and/or Fe) and diffusion aluminide coatings (i.e., coatings formed when Al is diffused into the substrate and other elements in the substrate form the coating along with the aluminum), typically used on turbine buckets, nozzles and shrouds, revealed the formation of aluminum nitride phases, either at the coating/substrate interface in the case of the MCrAlY coating, or within the coating itself in the case of the diffusion aluminide coatings. In the latter case, some of the coatings were rendered totally ineffective by this interaction and simply spalled off during a static air exposure. In the MCrAlY coating case, a continuous Al nitride layer was formed along the coating/substrate interface. Being a brittle phase, such a layer is not a desirable microstructure, since delamination of the protective coating would be less difficult than if no such layer existed.

The formation of these brittle nitride phases is the consequence of the availability of N in the HR-120. The nitrogen readily combines with the Al in the coating when the two elements encounter each other as a result of the interdiffusion of the two materials at high temperatures.

A need exists to avoid the formation of brittle nitride layers during the service exposure of coated HR-120. The present invention seeks to meet that need.

SUMMARY OF THE INVENTION

It has now been discovered that the formation of a brittle Al nitride phase as a result of interaction of the N in the HR-120 with the Al in the coating can be eliminated or inhibited by depositing an interlayer of material between the HR-120 and the oxidation-resistant coating. Surprisingly, the presence of such an interlayer can be accomplished with minimum effect upon the mechanical and physical properties of the coated alloy.

In a first aspect, the present invention provides a coated metal component containing an intentional addition of nitrogen, comprising an oxidation-resistant coating layer and an intermediate layer disposed between the oxidation-resistant coating layer and the component. The intermediate layer is substantially devoid of nitrogen which if present would form a brittle nitride phase with the aluminum from the oxidation-resistant layer.

In a further aspect, the present invention provides a method of forming a coating on a metal component containing an intentional addition of nitrogen, which comprises coating a first intermediate layer onto the component, with the intermediate layer being substantially devoid of nitrogen. An oxidation-resistant layer is then coated onto the intermediate layer.

BRIEF DESCRIPTION OF THE DRAWINGS

The invention will now be described with reference to the accompanying drawings, in which.

DETAILED DESCRIPTION OF THE INVENTION

Figure 1:
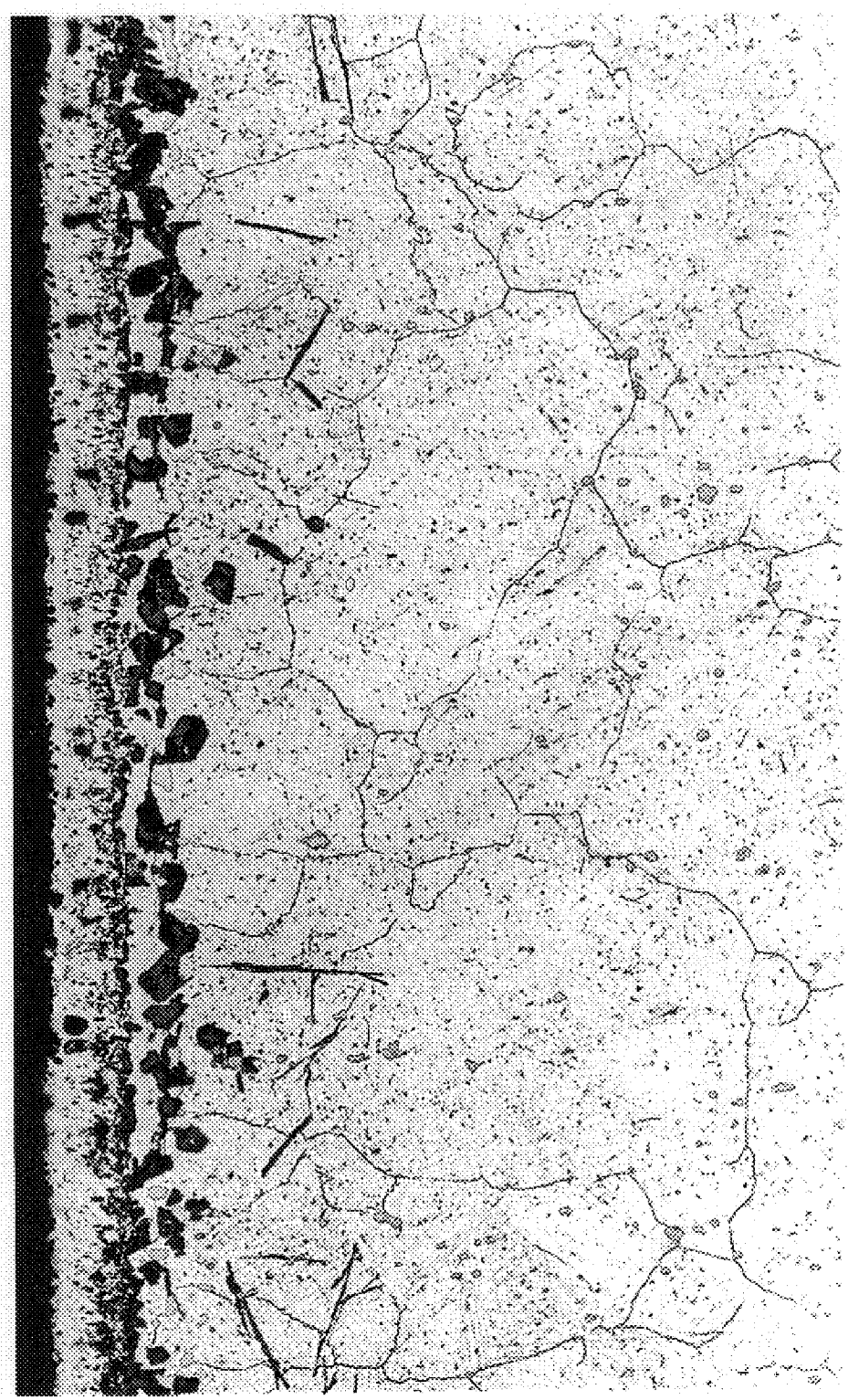
FIG. 1 is a photomicrograph of a sprayed MCrAlY coating on HR-120 after 1000 hrs. exposure at 1800F.

Referring to the drawings, FIG. 1 is a photomicrograph of a sprayed MCrAlY coating on HR-120 after 1000 hrs. exposure at 1800° F. The continuous, dark layer at the coating/substrate interface is the Al nitride phase formed when Al from the coating and N from the alloy meet each other. This tends to form a brittle, weak interface layer which means the coating spallation during service is much more likely.

Figure 2:
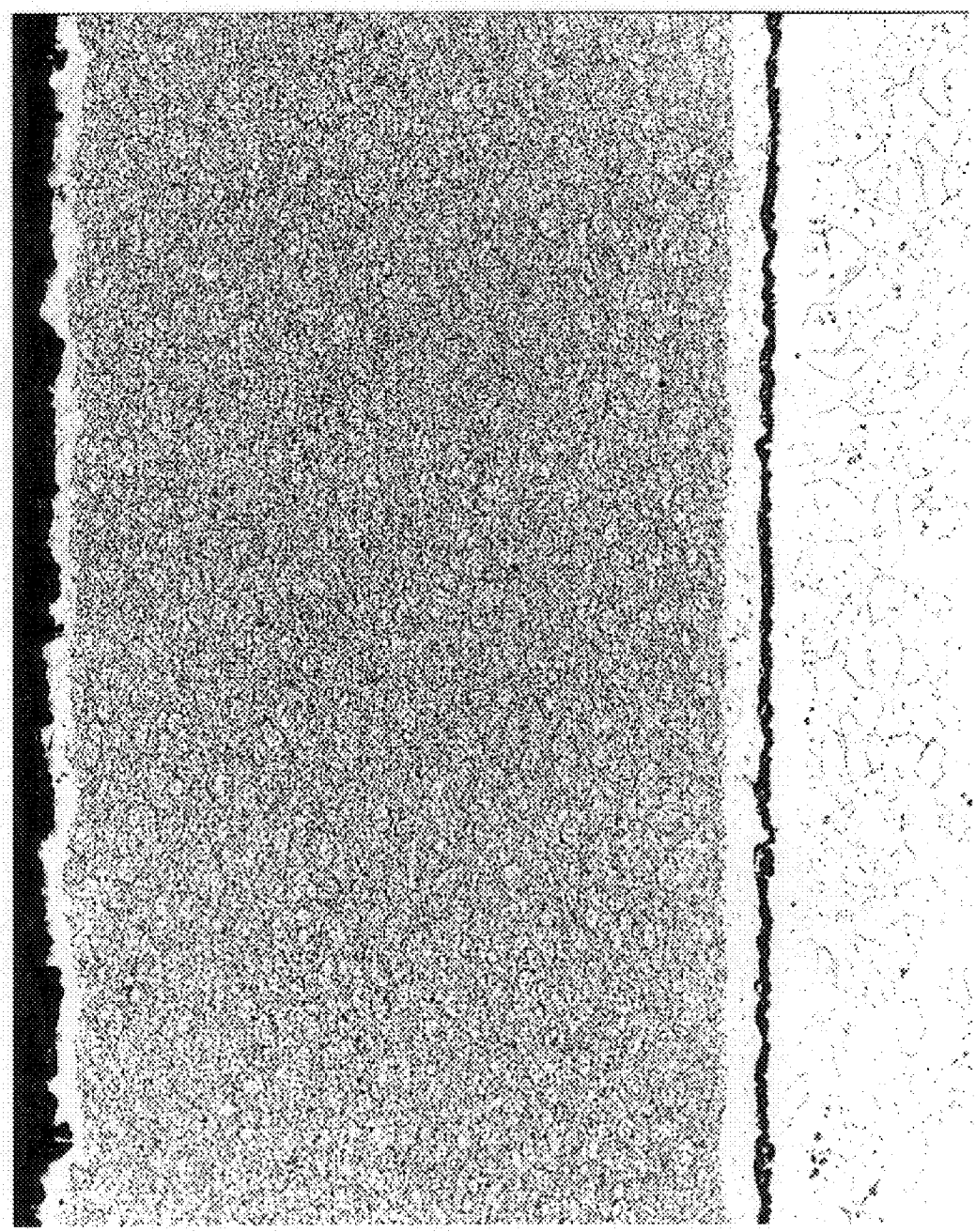
FIG. 2 is a photomicrograph showing the problem with a diffused aluminide coating after 1000 hrs. at 1900F.

FIG. 2 shows the problem with a diffused aluminide coating after 1000 hrs. at 1900° F. Here the dark nitride phase forms within the coating and into the base alloy beneath the coating due to Al diffusion into the alloy. In this case, there is a tendency to form more as large discrete particles rather than the continuous layer exhibited by the MCrAlY.

Figure 3:
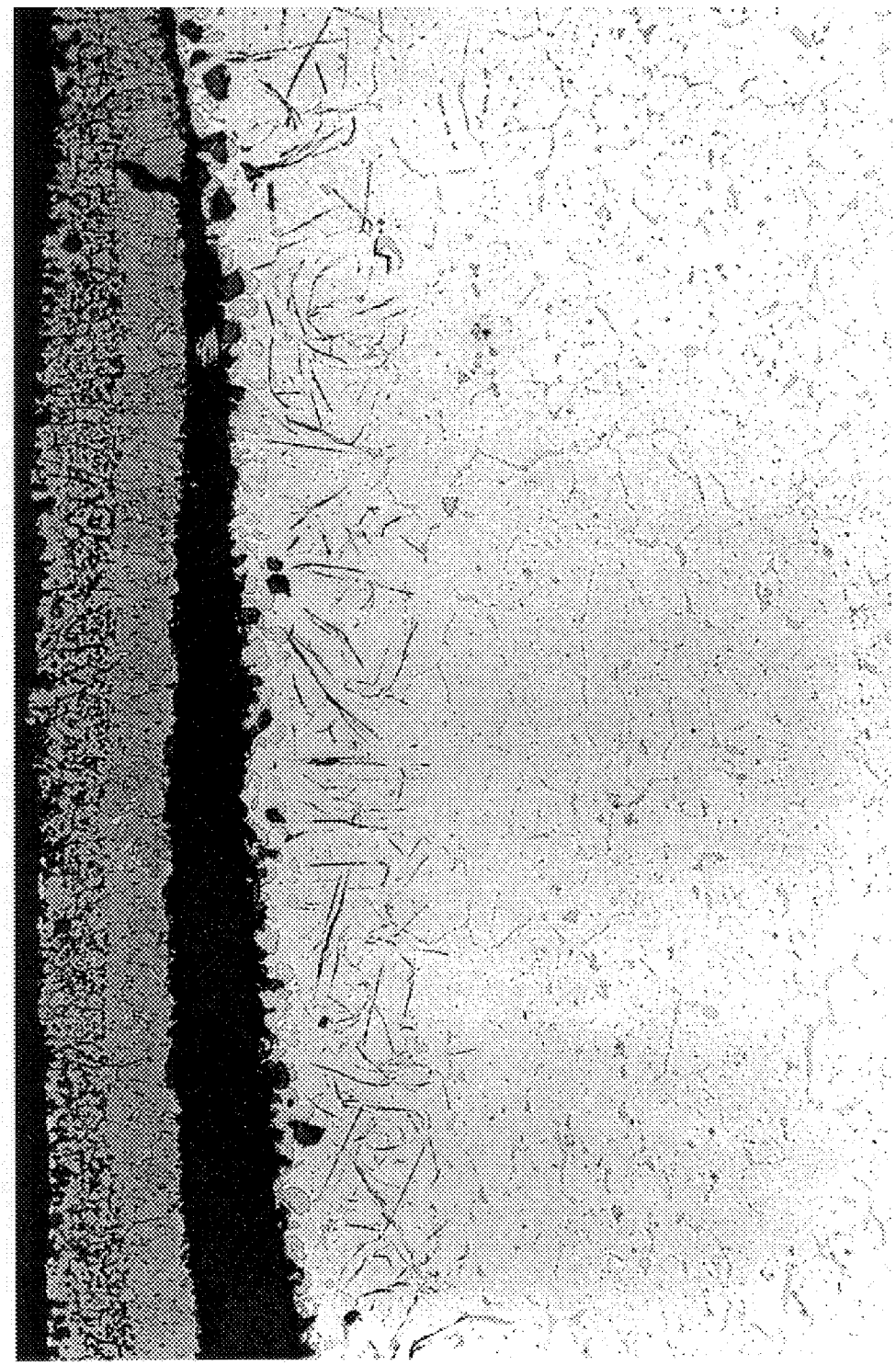
FIG. 3 is a photomicrograph showing what happened to another aluminided sample after 1000 hrs. at 1900° F.

FIG. 3 shows what was observed with another aluminided sample after 1000 hrs. at 1900° F. Here, the aluminide coating has delaminated as a result of the brittle nitride formation. Moreover, this occurred during an isothermal exposure without any thermal shocks as would be experienced in a machine.

The present invention is usually carried out by applying, by thermal spray (HVOF or VPS), a layer of material between the HR-120 and the Al-rich coating which is identical in composition to HR-120 except that it is devoid of nitrogen. By the term "devoid of nitrogen" is meant that nitrogen is not intentionally added as part of the alloy composition. Under such circumstances, nitrogen is typically present in an amount no greater than 50 ppm, more usually 5–25 ppm. This avoids having a nitrogen-containing material in intimate contact with an Al-rich coating, thereby precluding the formation of the Al nitride phases. The composition of the interlayer is the same as HR-120 without the intentional addition of nitrogen.

It will be seen that the composition of this intermediate layer is essentially the same as that of HR-120. Thus, any effect on oxidation and thermal properties of the alloy is minimal.

The interlayer has a thickness of, for example, 5–100 mils. More usually, the interlayer thickness ranges from 10–50, e.g. 15–35 mils, dependent on component geometry and operating temperature.

The present invention permits the use of this materials combination without formation of the brittle aluminide nitride phases which could result in premature coating failure and reduced parts lives. HR-120 has the advantages of good high temperature properties and relatively low cost, and is currently used as an inner shroud material in several gas turbine designs. Some of these applications require Al-rich coatings for high temperature oxidation protection. However, the invention is not limited to use with Al-rich coatings. The invention may also be used in conjunction with chromium (Cr) or silicon (Si) rich coatings, since those elements also display a strong tendency to form nitride phases when in the presence of N at high temperature.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A coated metal component comprising an oxidation-resistant coating layer and an intermediate layer disposed between said oxidation-resistant coating layer and said component, said intermediate layer being substantially devoid of nitrogen.

2. A component according to claim 1, wherein said oxidation resistant layer comprises an element selected from the group consisting of aluminum, chromium and silicon.

3. A component according to claim 1, wherein the component is comprised of HR-120 having a composition (wt %) of Ni 37; Cr 25; Co 3 max; Mo 2.5 max; W 2.5 max; Cb 0.7; Mn 0.7; Si 0.6; Al 0.1; C 0.05; B 0.004; N 0.2; balance Fe.

4. A component according to claim 1, wherein said intermediate layer has a composition (wt %) of Ni 37; Cr 25; Co 3 max; Mo 2.5 max; W 2.5 max; Cb 0.7; Mn 0.7; Si 0.6; Al 0.1; C 0.05; B 0.004; balance Fe.

5. A coated metal component suitable for use in a gas turbine, comprising an intermediate layer disposed on a surface of said component and an oxidation-resistant coating layer disposed on said intermediate layer, said intermediate layer being substantially devoid of nitrogen which if present would form a nitride with said oxidation-resistant layer.

6. A component according to claim 5, wherein said oxidation resistant layer comprises an element selected from aluminum, chromium and/or silicon.

7. A component according to claim 5, wherein the component is comprised of HR-120 having a composition (wt %) of Ni 37; Cr 25; Co 3 max; Mo 2.5 max; W 2.5 max; Cb 0.7; Mn 0.7; Si 0.6; Al 0.1; C 0.05; B 0.004; N 0.2; balance Fe.

8. A component according to claim 5, wherein said intermediate layer has a composition (wt %) of Ni 37; Cr 25; Co 3 max; Mo 2.5 max; W 2.5 max; Cb 0.7; Mn 0.7; Si 0.6; Al 0.1; C 0.05; B 0.004; balance Fe.

9. A component according to claim 5, wherein said intermediate layer has a thickness of 10–50 mils.

10. A method of forming a coating on a metal component, which comprises:

coating a first intermediate layer onto said component, said intermediate layer being substantially devoid of nitrogen; and coating a oxidation-resistant layer onto said intermediate layer.

11. A method according to claim 10, wherein the component is comprised of (wt %) of Ni 37; Cr 25; Co 3 max; Mo 2.5 max; W 2.5 max; Cb 0.7; Mn 0.7; Si 0.6; Al 0.1; C 0.05; B 0.004; N 0.2; balance Fe.

12. A method according to claim 10, wherein said intermediate layer has a composition (wt %) of Ni 37; Cr 25; Co 3 max; Mo 2.5 max; W 2.5 max; Cb 0.7; Mn 0.7; Si 0.6; Al 0.1; C 0.05; B 0.004; balance Fe.

13. A method according to claim 10, wherein said intermediate layer is applied to a thickness of 10–50 mils.

* * * * *